United States Patent [19]

Ohta et al.

[11] Patent Number: 4,872,034

[45] Date of Patent: Oct. 3, 1989

[54] METHOD FOR DIVIDING DENSITY RANGE OF COMPONENT DYES IN COLOR HARD COPY

[75] Inventors: Noboru Ohta; Koju Takahashi; Tsuneo Suzuki, all of Minami-Ashigara, Japan

[73] Assignee: Fuji Photo Film Co., Ltd., Kanagawa, Japan

[21] Appl. No.: 134,300

[22] Filed: Dec. 15, 1987

Related U.S. Application Data

[63] Continuation-in-part of Ser. No. 909,954, Sep. 22, 1986, abandoned.

[30] Foreign Application Priority Data

Sep. 25, 1985 [JP] Japan .................................. 60-211720

[51] Int. Cl.$^4$ ............................................. G03B 27/32
[52] U.S. Cl. ......................................... 355/77; 355/35
[58] Field of Search .............................. 355/77, 35, 38

[56] References Cited

U.S. PATENT DOCUMENTS 3,784,377 1/1974 Levy et al. ............................. 355/35
4,175,856 11/1979 Pone ....................................... 355/77
4,687,334 8/1987 Miyakawa ............................. 355/77

Primary Examiner—Monroe H. Hayes
Attorney, Agent, or Firm—Wenderoth, Lind & Ponack

[57] ABSTRACT

Density range division of component dyes of a color hard copy which is obtained by the combination of quantized color image signals is performed so that the lightness of the gray scale of the color hard copy is equally divided in accordance with the level number of the quantized color image signals. The density range division is also characterized in that the lightness of the component dyes of the color hard copy is equally divided in accordance with the level number of the quantized color image signals.

4 Claims, 6 Drawing Sheets

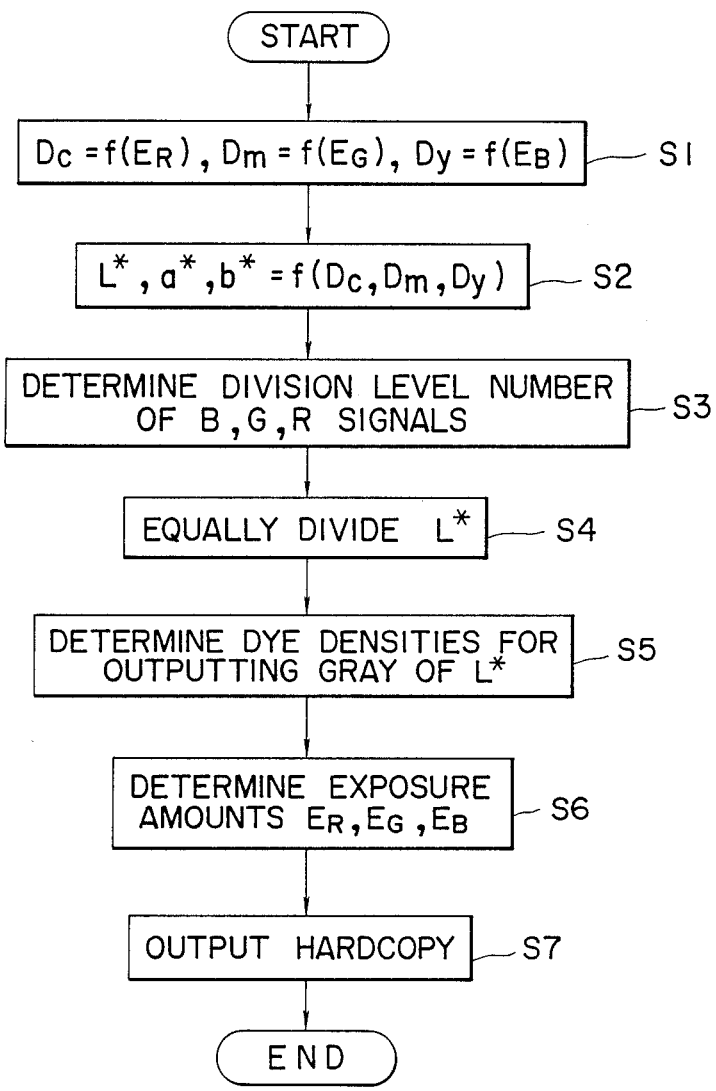
F I G. 7

4,872,034

METHOD FOR DIVIDING DENSITY RANGE OF COMPONENT DYES IN COLOR HARD COPY

CROSS-REFERENCE TO RELATED APPLICATION

This application is a continuation in part of our prior application Ser. No. 909,954, filed on Sept. 22, 1986, entitled "Method for Dividing Density Range of Component Dyes in Color Hard Copy", and now abandoned.

BACKGROUND OF THE INVENTION

This invention relates to a method for dividing a density range of component dyes of a color hard copy, particularly in the case where it is necessary to obtain the color hard copy from quantized color image signals.

Generally, when it is required to prepare or obtain a color hard copy from quantized color image signals, for example, where each signal consists of three bits (eight levels) for each of the component colors of blue B, green G and red R, the image quality of the obtained color hard copy is largely and significantly influenced by the manner in which the density range of the component dyes of yellow Y, magenta M and cyan C is divided according to the color image signals.

In a conventional method, a color hard copy is prepared by dividing density range (Dmax−Dmin) of the component dyes of Y, M and C by a number (N−1), with N being the "level number", to thereby equally divide the density of the component dye according to the levels of color image signals.

In the conventional method described above, however, it is difficult to obtain the color hard copy with the appropriate lightness reproduction especially in the high light range, where the lightness gap tends to be too great. There is also no guarantee in obtaining the exact gray reproduction. Accordingly, a method is disclosed in which the density range of the component dyes is equally divided while maintaining the density ratio of the dyes Y, M and C constituting the gray color as shown in FIG. 4. However, in the lightness reproduction as represented by the curve A shown in FIG. 1, of gray in the color hard copy, the variation of the lightness decreases as the level of the color image signal becomes large. This tendency also applies to the other colors as well as gray.

FIG. 2 shows a graph representing the relationship between a color difference number j and a color difference $\Delta E_j{}^i$ on a correspondingly obtained color hard copy in the case where the density range of the component dye is equally divided. In the graph, the level values j and j+1 of the color image signals correspond respectively to the colors $C_j{}^i$ and $C_j{}^i +1$ (i shows a color) on the color hard copy, and the difference therebetween is represented by a color difference $\Delta E_j{}^i$ (j is a color difference number). The color difference number is from members 1 to 7 in accordance with the level values 1 to 8, and the colors i, i.e., the seven colors of B (blue), G (green), R (red), Y (yellow), M (magenta), C (cyan) and K (black).

As is apparent from FIG. 2, the color difference $\Delta E_j{}^i$ is small in a dark region in which the color difference number j is large, whereas the color difference $\Delta E_j{}^i$ is large in a light region in which the color difference number is small.

For the reason described above, in the color reproduction of a color hard copy based on the color image signal where the density of the component dye is equally divided, a large color change (i.e. very large color difference) is observed in the light color region and a small color change (i.e. very small color difference) is observed in the dark color region, thus attaining a poor color continuity.

FIG. 3 shows a graph representing the relationship between the color difference $\Delta E_j{}^i$ and the frequency of the occurrence of that color difference. The graph shows that the frequencies are more or less similar to each other for all the color differences $\Delta E_j{}^i$. This shows that the portions having the large color difference and those having small color difference are distributed equally throughout the entire color image. Therefore, according to the conventional method, a color hard copy having a visually excellent reproduction of the color image is not obtained.

The nature, principle and utility of the invention will become more apparent from the following detailed description in conjunction with the accompanying drawings.

SUMMARY OF THE INVENTION

An object of this invention is to eliminate defects or disadvantages encountered in a prior art technique and to provide an improved method for dividing the density range of component dyes of a color hard copy to reproduce a visually favorable color image.

Another object of this invention is to provide an improved method capable of obtaining a color hard copy having an excellent color continuity with respect to lightness, hue, and saturation of all colors.

According to this invention, these and other objects can be achieved by providing a method for dividing the density range of the component dyes of a color hard copy where the densities of the component dyes are set correspondingly to a quantized color image signal of the blue, green and red colors, the method being characterized in that the lightness of a gray scale of a color hard copy obtained with respect to the color image signal is equally divided in accordance with a level number of the quantized color image signal, and in the other aspect, in that the density is divided so that lightness of the each component dye of the color hard copy is equally divided in accordance with the level number of the quantized color image signal.

BRIEF DESCRIPTION OF THE DRAWINGS

In the accompanying drawings:

FIG. 7 is a flow chart which shows an example operation of this invention method;

DESCRIPTION OF THE PREFERRED EMBODIMENT

Figure 1:
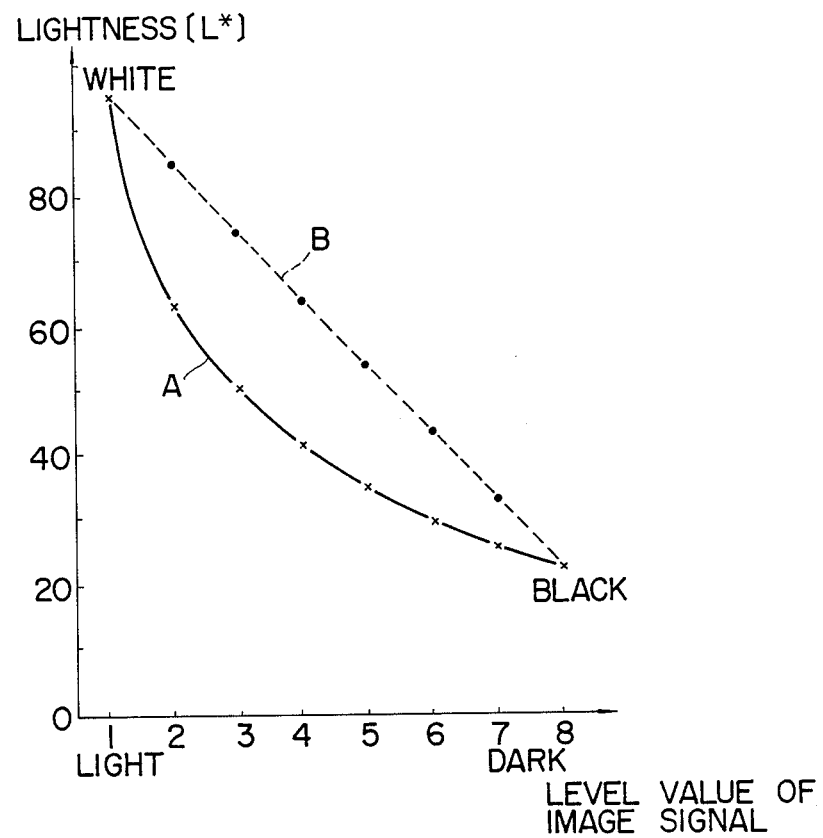
FIG. 1 is a graph which shows a relationship between the lightness and the level value of the image signal for explaining the density range division of component dyes of a color hard copy.
Figure 4:
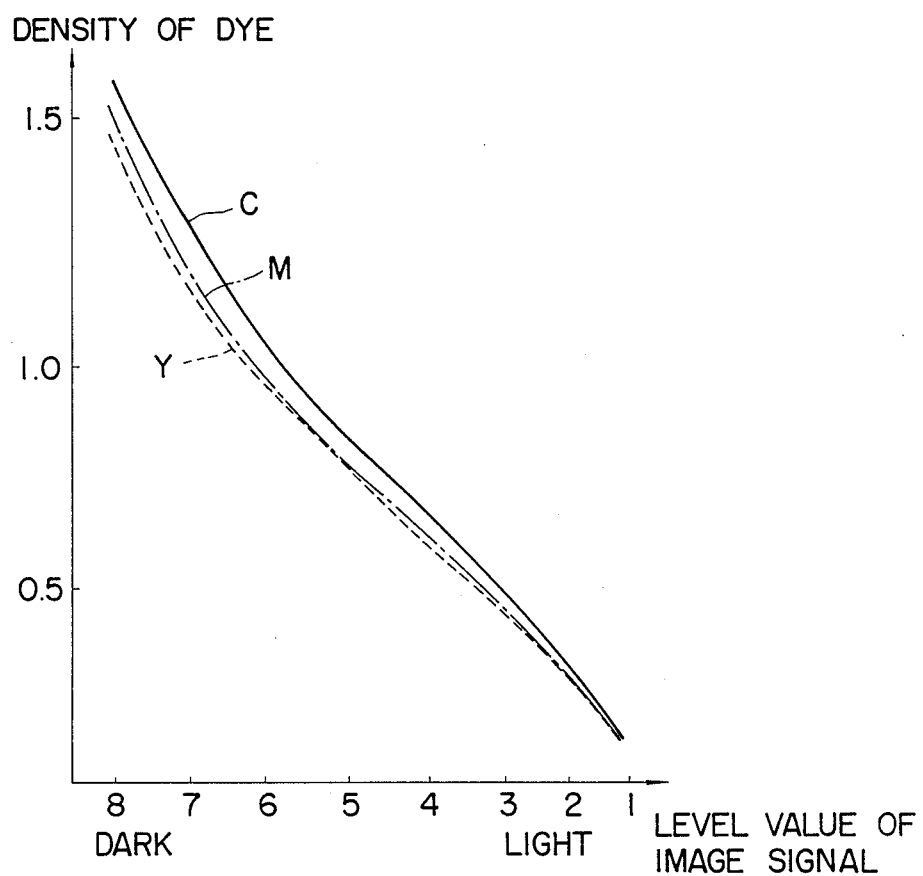
FIG. 4 is also a graph which shows the densities of colors Y, M and C with respect to the gray scale.

According to this invention, as represented by the characteristic line B shown in FIG. 1, a gray scale obtained on the color hard copy by the respective color image signals is divided equally in accordance with the lightness thereof. FIG. 4 shows characteristic curves of the dyes Y, M and C for obtaining the gray color. In the preparation of the typical colors using the characteristic curves Y, M and C in FIG. 4, the color differences $\Delta E_j{}^i$ between the respective signal levels will be represented by FIG. 5 with respect to the color difference numbers j. It should be noted that this invention employs the (L*a*b*) color space and the color difference $\Delta E_j{}^i$ prescribed by JIS (Japanese Industrial Standards) Z8729 (Method for displaying an objective color in accordance with "L*a*b*" color display system and "L*u*v*" color display system).

Figure 2:
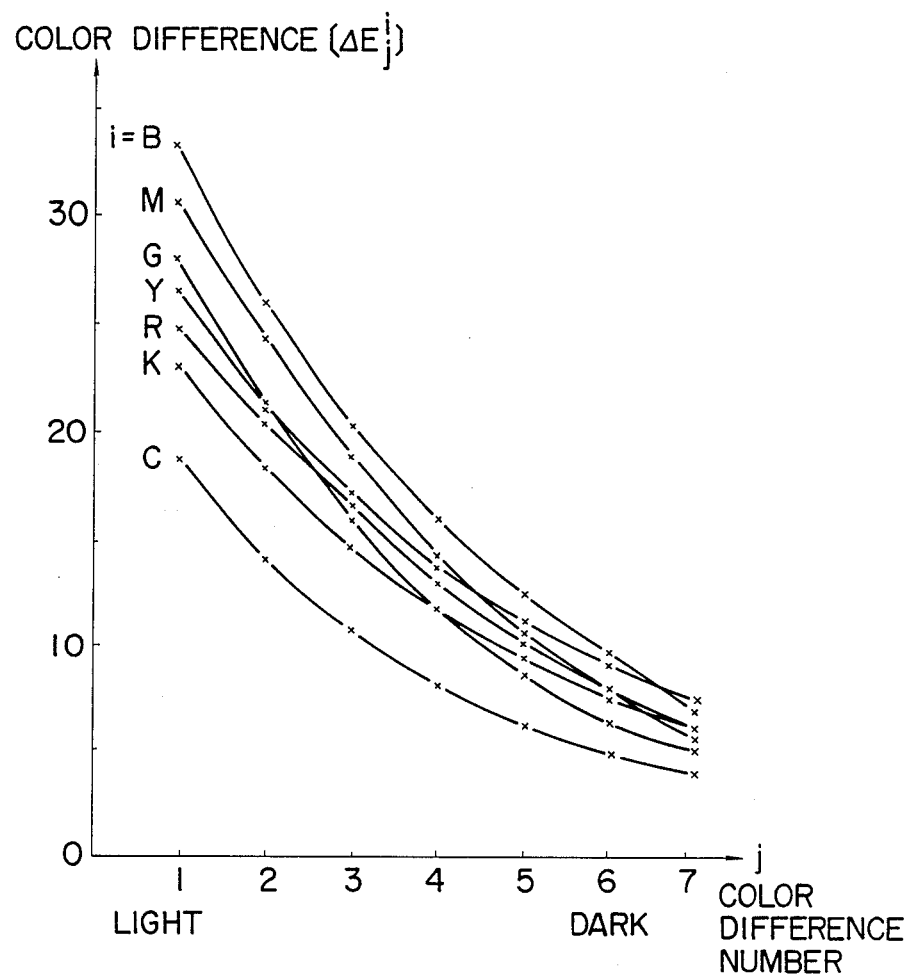
FIG. 2 is a graph which shows a relationship between the color differences and the color difference numbers in accordance with a conventional method.
Figure 5:
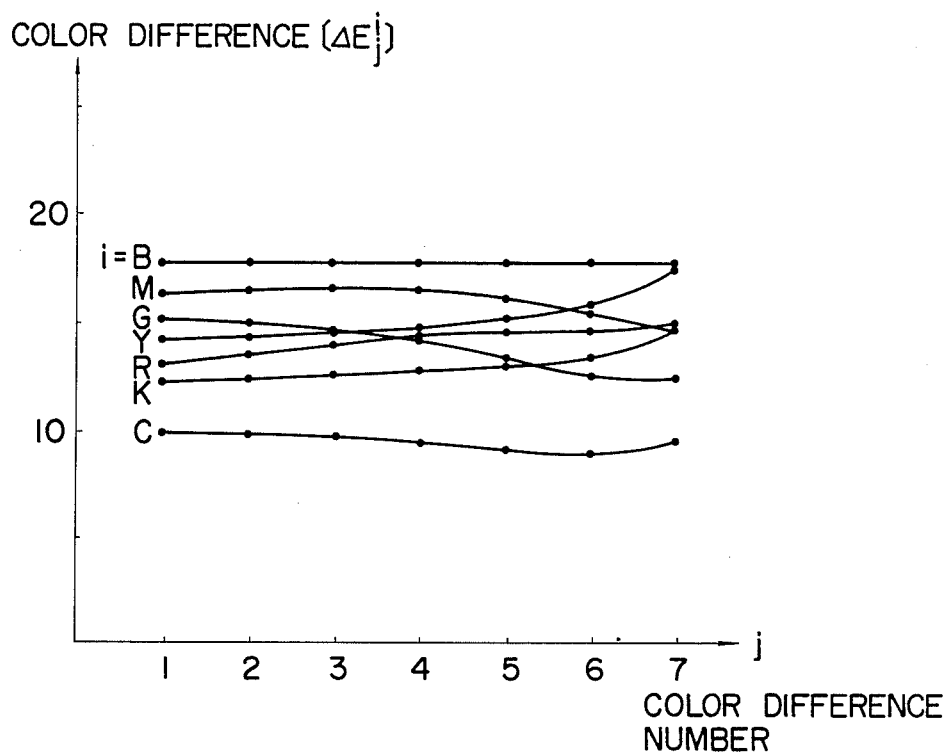
FIGS. 5 and 6 are the same as FIGS. 2 and 3 except this invention method is applied.

When the color differences $\Delta E_j{}^i$ in FIG. 5 are compared with the color differences $\Delta E_j{}^i$ in FIG. 2, it will be found that the equalization of the color differences $\Delta E_j{}^i$ can be remarkably improved by the method of this invention.

Figure 3:
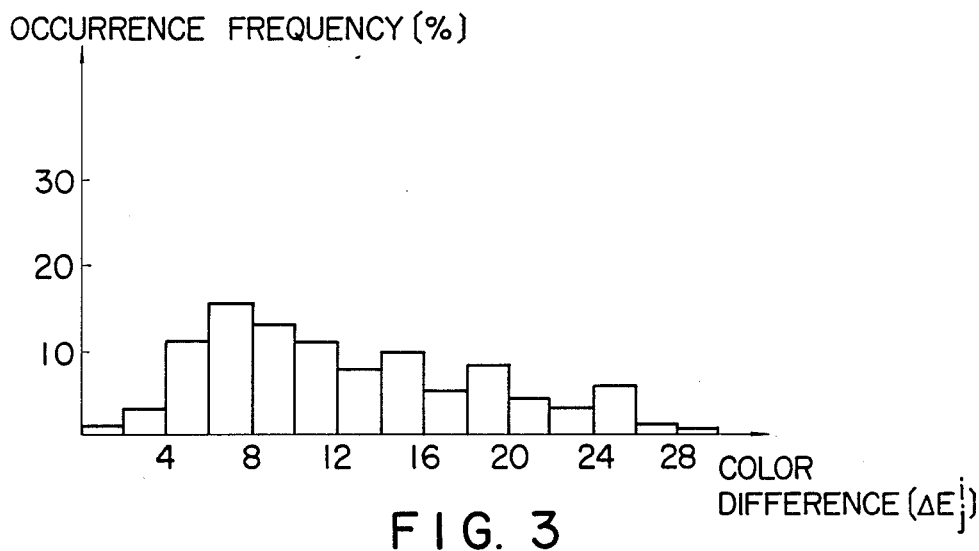
FIG. 3 is a graph which shows a relationship between the color differences and the frequency of the occurrence thereof in the conventional method.
Figure 6:
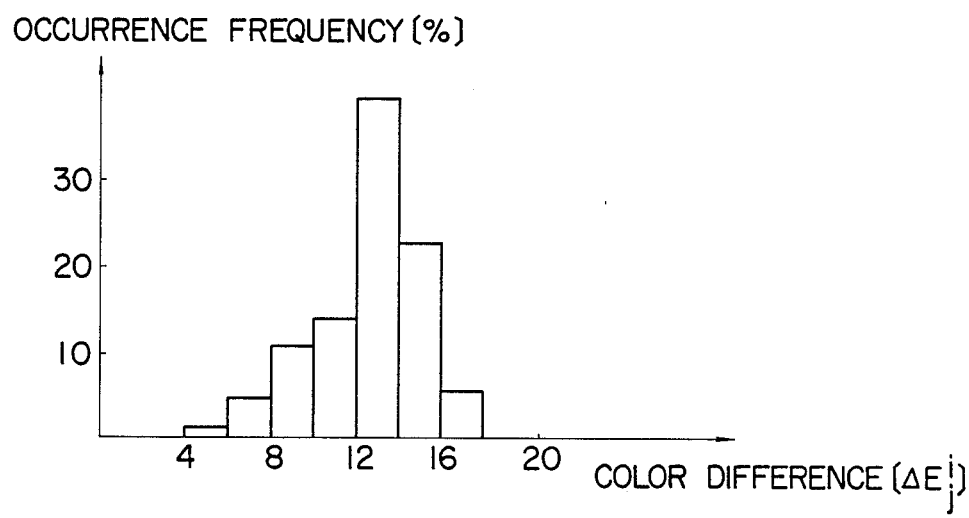

FIG. 6 shows a graph, similar to that shown in FIG. 3, representing the relationship between the color difference and the frequency of occurrence in accordance with this invention as to the example of an equally divided lightness. The graph of FIG. 6, showing an increase in which the frequency of the occurrence of the color differences in the specific ranges, shows that the equalization of the color differences is improved.

Referring to the flow chart shown in FIG. 7, the operation according to this invention is now described in detail.

Figure 8:
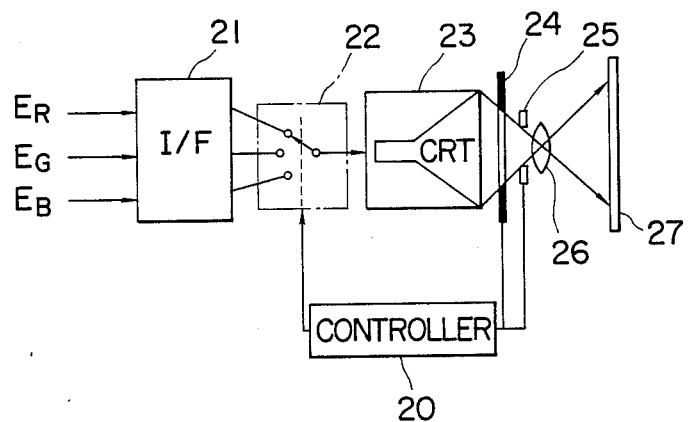
FIG. 8 is a constructional view of an exposure apparatus to which this invention method is applicable.
Figure 9:
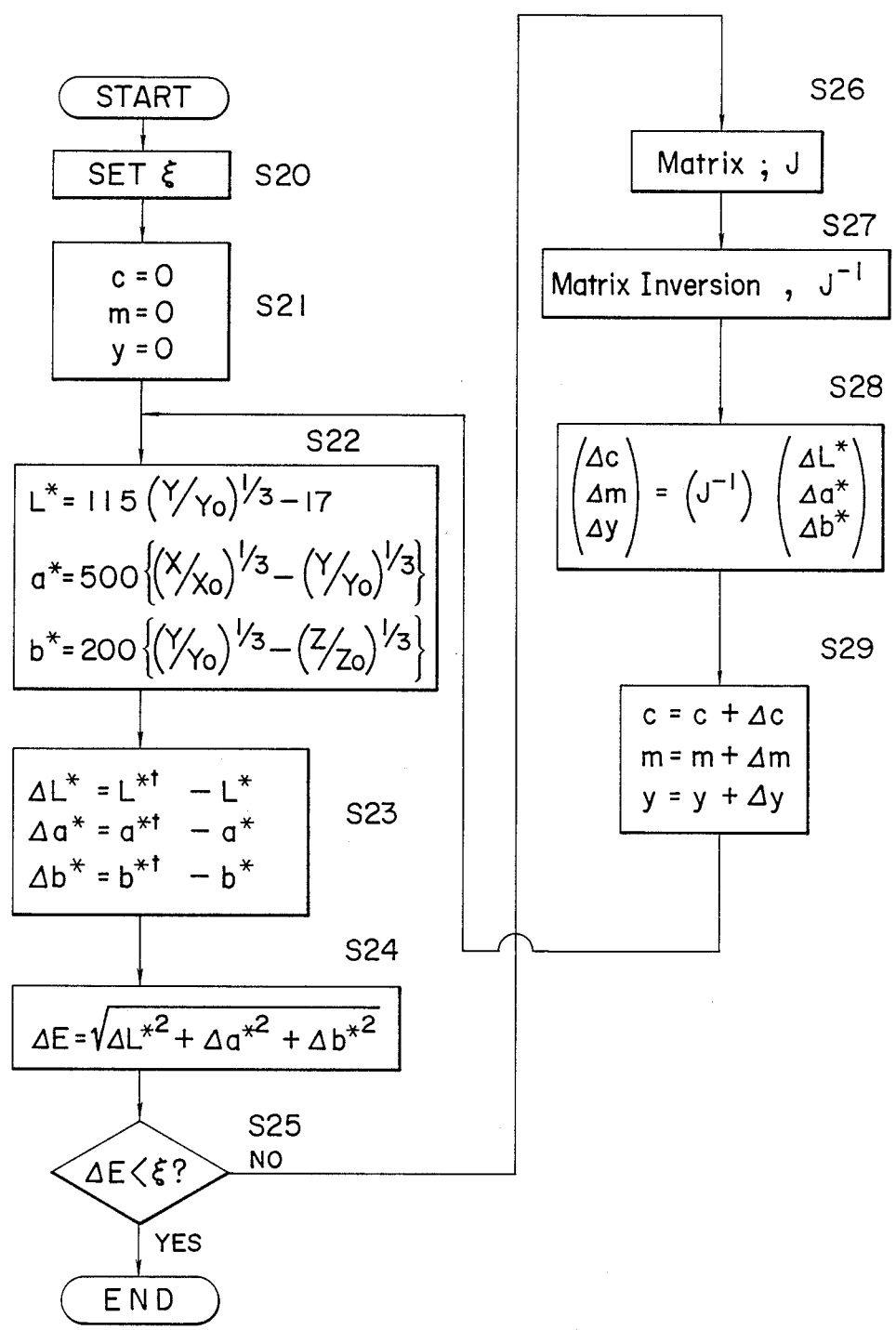
FIG. 9 is a flow chart which shows an algorithm of a color matching used in this invention method.

First, the relationship betwen the exposure amounts $E_R$, $E_G$, $E_B$ of the three colors R, G, B, and component densities $D_c$, $D_m$, $D_y$ of a color film 27 to be printed are obtained by using an exposing apparatus as shown in FIG. 8 which produces color hard copies (Step S1). The relationships are expressed as functions $D_c = f(E_R)$, $D_m = f(E_G)$ and $D_y = f(E_B)$, respectively. That is, signals corresponding to the exposure amounts $E_R$, $E_G$, $E_B$ of the three colors R, G, B, three colors are inputted to an interface 21 in the exposing apparatus, and are further applied to a CRT (cathode ray tube) 23 through a switching circuit 22 of which three contacts are operatively switched by a controller 20 in correspondence with R, G, B inputs. The CRT 23 luminesces a lightness corresponding to the inputted exposure amount, the illuminated light is exposed on the color film 27 through a color filter 24 and a shutter 25, which are also controlled by the controller 20, as well as through a lens unit 26. The exposure operation of the color film 27 is sequentially performed with respect to the three colors of R, G and B. Photographic processes of the color film 27, such as developing, are sequentially performed after exposure and then the component densities $D_c$, $D_m$, $D_y$ are obtained by measuring the respective densities of C, M, Y on the processed color film 27 with a densitometer. Next, the relationship among the densities $D_c$, $D_m$, $D_y$ of C, M, Y colors are determined by using the above processed color film 27 in order to produce a gray of a certain lightness (Step S2). This determining operation is carried out in accordance with an algorithm shown in FIG. 9. That is, tolerance value $\epsilon$ is set (Step S20) and then initial values c, m, y of C, M, Y colors are respectively set to "8" (Step S21). The lightness L* and the color tones a*, b* of the "Uniform Color Space, CIE 1976" are inputted after conversion from c, m, y to X, Y, Z (Step S22), and then respective differences ⌐L*, ⌐a*, ⌐b* between the lightness L*, the color tones a*, b* and desired values L, a, b** thereof are obtained as ⌐L* = L** − L*, ⌐a* = a** − a*, ⌐b* = b** − b* (Step S23). Further, value E = ⌐L*² + ⌐a*² + ⌐b*² is calculated due to the differences ⌐L*, ⌐a* and ⌐b* obtained at the above step S23 (Step S24), and the value E is judged as a whether or not it is less than the set tolerance value $\epsilon$ (Step S25). The determining operation is completed if the value E is less than the tolerance $\epsilon$. However, if the value E is not less than the tolerance $\epsilon$ at the above step S25, matrix J is calculated (Step S26) and then matrix inversion $J^{-1}$ is calculated (Step S27). Values ⌐c, ⌐m, ⌐y are obtained using the matrix inversion $J^{-1}$ and the differences ⌐L*, ⌐a*, ⌐b* (Step S28), the values c, m, y are corrected as c = c + ⌐c, m = m + ⌐m, y = y + ⌐y in accordance with the obtained values ⌐c, ⌐m, ⌐y (Step S29) and the determining operation returns to the above step S22. Thereafter, the division level number (quantization number) of R, G, B signals is determined (Step S3), the visual lightness L* is divided equally with the division level number of the R, G, B signals (Steps S4) and then the dye densities are determined so as to output the gray of the equally divided lightness L* (Step S5). The exposure amounts $E_R$, $E_G$, $E_B$ are determined in order to output the dye densities $D_c$, $D_m$, $D_y$ obtained at the above step S5 (Step S6) and a color hard copy is obtained by inputting the dye densities $D_c$, $D_m$, $D_y$ to the exposing apparatus (Step S7).

In the embodiment described hereinbefore, although the lightness is equally divided by the gray scale of the dyes, Y, M and C, the density division of the component dyes can be decided so that the respective component dyes are equally divided with the lightness L* in a case where the reproduction of gray is not so severely considered.

As described hereinbefore, according to the method of this invention, a color reproduction image of a color hard copy having substantially the constant color difference and suitable color continuity can be obtained.

It should be understood that many modifications and adaptations of the invention will become apparent to those skilled in the art and it is intended to encompass such obvious modifications and changes in the scope of the claims appended hereto.

What is claimed is:

1. A method for dividing a density range of component dyes in a color hard copy which comprises the steps of:

obtaining first relationships between exposure amounts ($E_R$, $E_G$, $E_B$) of three colors (R,G,B) of an exposing apparatus which outputs said color hard copy and component dye densities ($D_C$, $D_M$, $D_Y$) of a color film to be printed.

determining a second relationship between said component dye densities ($D_C$, $D_M$, $D_Y$) and a visual lightness (L*) so as to produce gray of a certain lightness on said color film;

determining a division level number for R, G, B, color image signals;

equally dividing a visual lightness (L*) by said division level number;

determining dye densities so as to output gray of the thus equally divided lightness (L*);

determining the exposure amount ($E_R$, $E_G$, $E_B$) in order to output said dye densities;

inputting the thus determined exposure amounts of said exposing apparatus to thereby obtain a color hard copy.

2. A method as claimed in claim 1, wherein said gray is obtained as a gray scale of characteristic curves of cyan, magenta and yellow.

3. A method as claimed in claim 1, wherein the first relationships are expressed by functions $D_C = f(E_R)$, $D_M = f(E_G)$, $D_Y = f(E_B)$.

4. A method as claimed in claim 1, wherein the second relationship is expressed by a function $L^* a^* b^* = f(D_C, D_M, D_Y)$, wherein $a^*$, $b^*$ are color tones.

* * * * *